United States Patent [19]

Tanaka et al.

[11] Patent Number: 4,906,114
[45] Date of Patent: Mar. 6, 1990

[54] ELECTRONIC TYPEWRITER

[75] Inventors: Kenji Tanaka; Kiyotaka Mori, both of Tosu, Japan

[73] Assignee: Matsushita Electric Industrial Co., Ltd., Osaka, Japan

[21] Appl. No.: 240,350

[22] Filed: Sep. 1, 1988

Related U.S. Application Data

[63] Continuation of Ser. No. 943,940, Dec. 9, 1986, abandoned.

[30] Foreign Application Priority Data

Dec. 6, 1985 [JP] Japan .................. 60-283339
Feb. 17, 1986 [JP] Japan .................. 61-32330

[51] Int. Cl.$^4$ ............................................. B41J 3/00
[52] U.S. Cl. ............................... 400/17; 400/21; 400/65; 340/734
[58] Field of Search ............... 364/519, 520, 523

[56] References Cited

U.S. PATENT DOCUMENTS

| | | | |
|---|---|---|---|
| 3,872,959 | 3/1975 | Wang et al. | 400/65 |
| 3,968,868 | 7/1976 | Greek, Jr. et al. | 400/63 |
| 4,291,305 | 9/1981 | Kimura et al. | 340/734 |
| 4,314,357 | 2/1982 | Kimura et al. | 340/734 |
| 4,420,770 | 12/1983 | Rahman | 340/703 |
| 4,517,658 | 5/1985 | Iida | 340/721 |
| 4,615,012 | 9/1986 | Arazu et al. | 400/17 |
| 4,623,978 | 11/1986 | Aoki | 364/523 |
| 4,642,779 | 2/1987 | Sawada | 400/18 |
| 4,710,885 | 12/1987 | Litteken | 400/65 |

FOREIGN PATENT DOCUMENTS

| | | | |
|---|---|---|---|
| 185682 | 10/1984 | Japan | 400/65 |
| 151083 | 8/1985 | Japan | 400/17 |
| 242088 | 12/1985 | Japan | 400/16 |
| 2084365 | 4/1982 | United Kingdom | 400/18 |

OTHER PUBLICATIONS

Herrold et al., "Printer . . . for Forming Lines", IBM Technical Disclosure Bulletin, vol. 22, No. 4, pp. 1340–1343.

Primary Examiner—William Pieprz
Attorney, Agent, or Firm—Wenderoth, Lind & Ponack

[57] ABSTRACT

An electronic typewriter has a function of making a rectangular frame, which is composed of a horizontal line and a vertical line. To make a frame in the course of the sequential input of characters, an operator moves the printing position to the upper left vertex of the frame that is to be printed, and then, the operator depresses a specific key, which is called frame key, when the printing position arrives at the upper left vertex of the frame that is to be printed. After the operator puts in characters or spaces that are to be inserted in the frame, the operator moves the printing point to the lower right vertex of the frame and the operator then depresses the frame key again. By the operations of twice depressing the frame key, the printing position data for making the frame is taken in. The electronic typewriter then calculates both the starting and ending positions of the segments that compose the frame. At the conclusion of this calculation, the electronic typewriter prints the frame by using underline type and vertical bar type.

26 Claims, 11 Drawing Sheets

ELECTRONIC TYPEWRITER

This application is a continuation, of now abandoned application Ser. No. 943,940, filed Dec. 9, 1986 now abandoned.

BACKGROUND OF THE INVENTION

This invention relates to an electronic typewriter with the function of making a frame of a table without repetition of the depression of an underline key or vertical bar key.

Though an electronic typewriter is generally used for printing characters, there is a need to make a rectangular frame by printing horizontal lines and vertical lines. In one case, a rectangular frame is situated around a single word or single numeral. In another case, the rectangular frame is situated at the outermost circumference of a latticed table which comprises words or numerics arranged in order in columns. For this reason, in an electronic typewriter, there is a type of vertical bar for printing a continuous vertical line that composes a frame. The electronic typewriter prints horizontal lines and vertical lines that compose a frame, using this type of vertical bar and this type of underline.

The following is an explanation of the operation needed in the case of making a frame of a table with typewriters currently in use. Before the printing of a frame, an operator operates keys corresponding to characters which should be inserted into a column of a frame that is to be printed, watching where a placed character is located on a printing sheet.

To set the head position of the words, an operator has set tabs previously. The operator depresses a tab key every time that the operator finishes the input of characters into one column, so as to move the printing point to the next column.

After the operator has put characters into each column, the operator moves the printing point to the upper left vertex of a frame which is to be printed, by moving the carriage and sheet. Next, the operator prints upper horizontal line which composes a frame by depressing the key corresponding to an underline many times. After that, the operator prints horizontal lines that divides the frame of a table and prints the lower horizontal line that composes the frame, and then the operator moves the printing point to the upper left vertex of the frame which is to be printed, again. The operator then prints a vertical bar segment by depressing a key corresponding to a vertical bar. By repeating this operation, the operator prints a vertical line. After moving the printing position down one character, the operator prints a vertical bar segment again. At this time, the operator adjusts the printing point for moving the carriage and printing sheet little by little, because the starting point of the vertical line is in accordance with the starting point of horizontal line. This adjustment needs skill by the operator, so the operator adjusts by estimating the location of printing of one edge of vertical bar that is to be printed.

Thus, to make a frame with currently used typewriters is very difficult for an operator.

SUMMARY OF THE INVENTION

Therefore, a primary object of this invention is to provide an electronic typewriter which can make a frame of a table with easy and simple operators that need not require the operator to estimate the location of the printing point.

Another object of this invention is to provide an electronic typewriter with which an operator can easily make a frame of a table.

Another object of this invention is to provide an electronic typewriter which stores data necessary to make a table by storing the operators of the keys in the order of their operation, and prints a table according to the stored data.

Another object of this invention is to provide an electronic typewriter which can enlarge a frame automatically without the overprinting of characters, if the operator revises the characters inserted in a column.

Another object of this invention is to provide an electronic typewriter which can make a frame of a table with the printing type currently in use.

These and other objects of the invention are achieved in a typical embodiment as follows.

An electronic typewriter in accordance with the present invention has a frame key that is used for setting the printing position of two diagonal vertices of the frame. In this apparatus, the operator operates a frame key provided in the keyboard. Then, a key distinguishing circuit determines that the frame key has been depressed. At this time, a control circuit judges if a memory has stored in the printing point data corresponding to the first vertex when the frame key was operated. If the memory has not yet stored the printing point data corresponding to the first vertex when the frame key was operated, the control circuit records this printing point in a memory as printing point data corresponding to the first vertex of the frame that is to be printed.

If the memory has stored the position data of the printing point corresponding to the first vertex when the frame key was operated, the control circuit records the position data of this printing point as a second vertex of a frame that is to be printed.

A calculate circuit calculates the position data of a printing point of the starting and ending of each segment that composes a frame, from data of the printing point of the two vertices which were stored in the memory.

A control circuit prints a frame by controlling a printer, a printing point mover and a sheet feeder, according to the data that the calculate circuit has calculated.

DETAILED DESCRIPTION OF THE PREFERRED EMBODIMENTS

Figure 1:
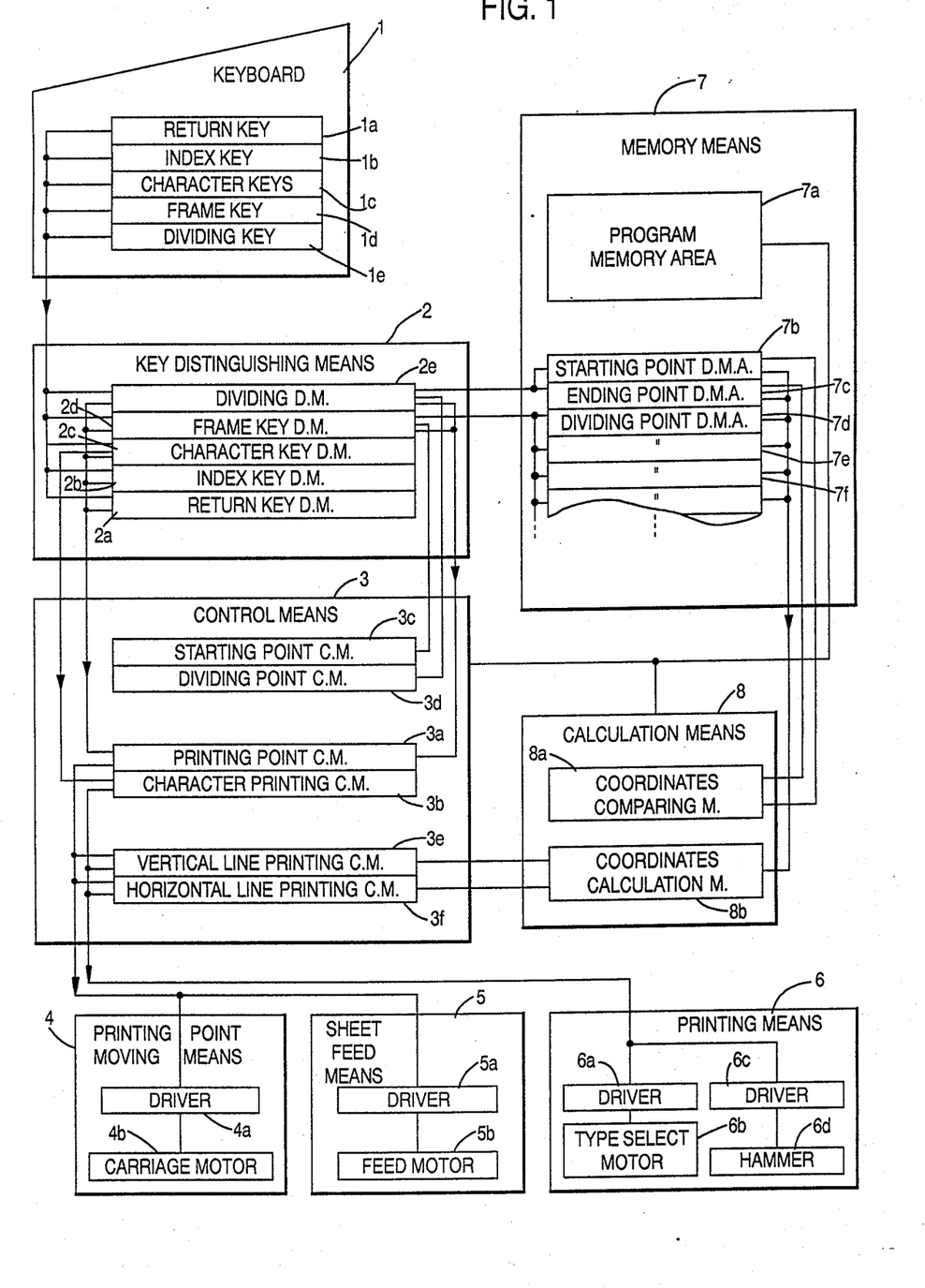
FIG. 1 is a function block diagram of an electronic typewriter of a preferred embodiment of this invention.

Referring now to FIG. 1, there is shown a function block diagram of electronic typewriter of a preferred embodiment in accordance with the present invention.

This electronic typewriter has a keyboard 1 provided with many keys. In more detail, keyboard 1 has a return key 1a, an index key 1b and character keys 1c. The return key 1a is used for advancing the printing line by one line and for returning the printing point to the starting point. The index key 1b is used for advancing the printing line by half of one line. The character keys 1c are used for printing alphabetic and numeric characters. These keys are provided in current electronic typewriters, too. The keyboard 1 also has a frame key 1d and a dividing key 1e. The frame key 1d is used for setting the printing point of the two diagonal vertices of the rectangular frame, which is composed of horizontal line and vertical line. In one case, the rectangular frame is situated around a single word or a single numeral. In another case, the rectangular frame locates the outermost circumference of a latticed table that comprises single or plural columns in the horizontal and vertical directions. A latticed table comprises words or numerics arranged in order in each column. The two diagonal vertices are the upper left vertex and lower right vertex of the frame. The dividing key 1e is used for setting the printing point of the starting point of both the vertical line and horizontal line that divides the frame. In response to the operation of a key of the keyboard 1, data corresponding to the key are sent to the key distinguishing means 2.

The key distinguishing means 2 determines which key was operated by the operator. In more detail, the key distinguishing means 2 has a return key distinguishing means 2a that determines if the return key 1a was depressed, an index key distinguishing means 2b that determines if the index key 1b was depressed, a character key distinguishing means 2c that determines if the character keys 1c were depressed and which character key was depressed, a frame key distinguishing means 2d that determines if the frame key 1d was depressed, and a dividing key distinguishing means 2e that determines if the dividing key 1e was depressed. The key distinguishing means 2 puts out data corresponding to the operated key.

In response to an output frame the key distinguishing means 2, a control means 3 puts out a control signal. In more detail, a printing point control means 3a generates a signal for advancing the printing point by one character width, in response to the operator of the character keys 1c, frame key 1d and dividing key 1e. A printing point control means 3a generates a signal for advancing the printing line by one line and for moving the printing point to a first point, in response to the operation of the return key 1a. The printing point control means 3a generates a signal for advancing the printing line by half of one line, in response to the operation of the index key 1b. In response to the operation of the character keys 1c, a character printing means 3b generates a signal for printing a character corresponding to the operated character key. In response to the operation of the frame key 1d, a starting point distinguishing means 3c determines if the printing point located at the time when the frame key 1d was operated corresponds to a first vertex or a second vertex of the frame that is to be printed. In response to the operation of the dividing key 1e, a dividing point distinguishing means 3d determines if the printing point of the first vertex of the frame has already been set. In the case of the printing of a vertical line of frame and of dividing a frame, a vertical line printing means 3e generates a signal to print a vertical line. In the case of printing a horizontal line of the frame and of dividing the frame, a horizontal line printing means 3f generates a signal to print a horizontal line.

According to the output of the control means 3, a printing means 6 carries out printing. The printing means 6 has a type select motor 6b to select a type, and a driver 6a to drive the type select motor 6b, and a hammer 6d for impact printing, and a driver 6c to drive the hammer 6d. There is a carriage that is able to move along a printing point moving means 4. The carriage is not illustrated in FIG. 1. The printing point moving means 4 has a carriage motor 4b to move the carriage and a driver 4a for a carriage motor 4b. The printing point moving means 4 moves the printing means 6 along a printing sheet. As a result of this, the printing point on a printing sheet changes.

A sheet feed means 5 sends the printing sheet in the direction across the direction in which the printing point moving means 4 moves the printing means 6. The sheet feed means 5 has a feed motor 5b to send the printing sheet, and a driver 5a for the feed motor 5b.

A program for the control means 3 was stored in a program memory area 7a of a memory means 7. The memory means 7 has not only stored the program, but has also stored data necessary for control. The memory means 7 has a starting point data memory area 7b for storing printing point data corresponding to one vertex of the frame upon the operation of the frame key 1d, and an ending point data memory area 7c for storing pointing point data corresponding to another vertex of the frame upon the operation of the frame key 1d. The two vertices whose position data are stored in both the starting point data memory area 7b and the ending point data memory area 7c are located in the corners that are in a diagonal position. Dividing point data memory areas 1d and 1e and 1f store printing point data upon the operation of the dividing key 1e. Printing point data is stored in the memory means 7 when the key distinguishing means 2 determines that the operation of the frame key 1d and the dividing key 1e has occurred.

According to data that is stored in the memory means 7, the calculation means 3 calculates the data necessary for making a table. In more detail, a coordinate comparing means 8a compares data stored in the starting point data memory area 7b, with data stored in the ending point data memory area 7c, and calculates coordinate data of the printing point of both the upper left vertex and the lower right vertex of the frame. A coordinate calculation means 8b calculates the coordinate data of the starting point and ending point of the segments that compose a frame and a dividing line of the table, according to the coordinate data of the printing point of the two diagonal vertices of the frame that have been stored in the starting point data memory area 7b and the ending point data memory area 7c, and the coordinate data of the printing point of the dividing points that have been stored in the dividing point data memory areas from 7d to 7f.

Figure 2:
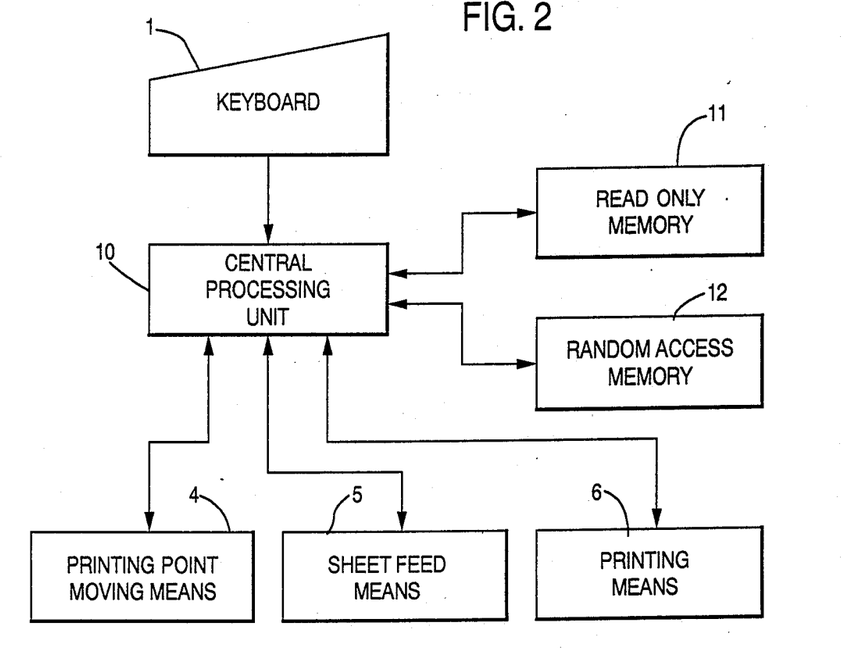
FIG. 2 is an equipment block diagram of the electronic typewriter of FIG. 1.

Referring to FIG. 2, there is shown as equipment block diagram of an electronic typewriter according to this invention. The key distinguishing means 2, control means 3 and calculation means 8 are composed of a central processing unit 10, a read only memory 11 and a random access memory 12. To perform some functions, the central processing unit 10 carries out a program stored in the read only memory 11, exchanging data with the random access memory 12.

Figure 3:
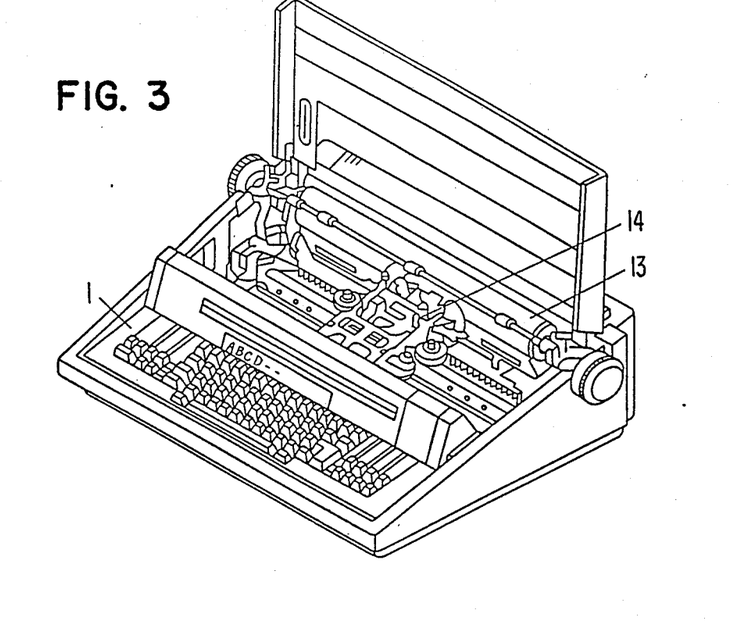
FIG. 3 is a perspective view of the electronic typewriter of FIG. 1.

Referring to FIG. 3, there is shown a perspective view of an electronic typewriter according to this invention. The keyboard 1 is located on the front face of this electronic typewriter. A platen 13 which is driven by the feed motor 5b, is located in the back of the electronic typewriter. A carriage 14 which is driven by the carriage motor 4b is located in the front of the platen 13. The carriage 14 is moveable along platen 13, carrying the printing means 6.

The following is an explanation of the operation of the electronic typewriter described above.

Figure 4:
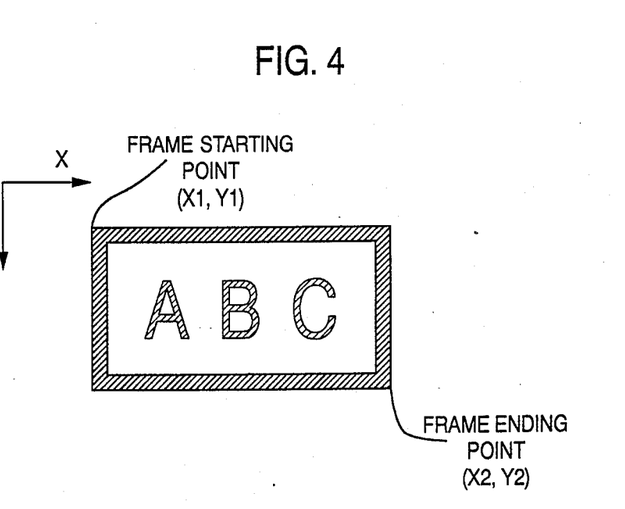
FIG. 4 is a plane view of a printed sheet on which an electronic typewriter of a preferred embodiment has made a frame around characters.

Referring to FIG. 4, there is shown a plane view in the case of the printing of a frame around a row of characters "ABC". We define X-Y coordinates as is shown in FIG. 3, to make this explanation clear. The coordinates of the upper left vertex of the frame is (X1, Y1). We call the upper left vertex the frame starting point. The coordinates of the lower right vertex of the frame is (X2,Y2). We call the lower right vertex the frame ending point.

Figure 5A:
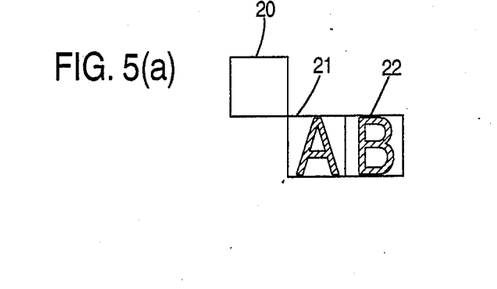
FIG. 5 is a plane view which shows a condition in the middle of printing as shown in FIG. 4.

As is shown in FIG. 5(a), a printing point 21 corresponds to the printing position where character "A" is printed. If the operator operates the character key 1c corresponding to the character "A" when the printing means 6 is located at printing point 21, the character "A" is printed in a position corresponding to the printing point 21. After the printing of the character "A", the printing means moves to the printing point 22.

The printing point 22 corresponds to the printing position that character "B" is printed. The printing point 21 corresponds to the printing position of the upper left corner of the frame that is to be printed. The printing point 20 is located backward by one character width and backward by one line spacing.

Figure 5B:
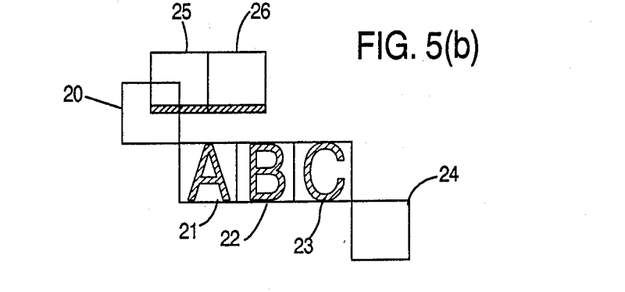
Figure 9:
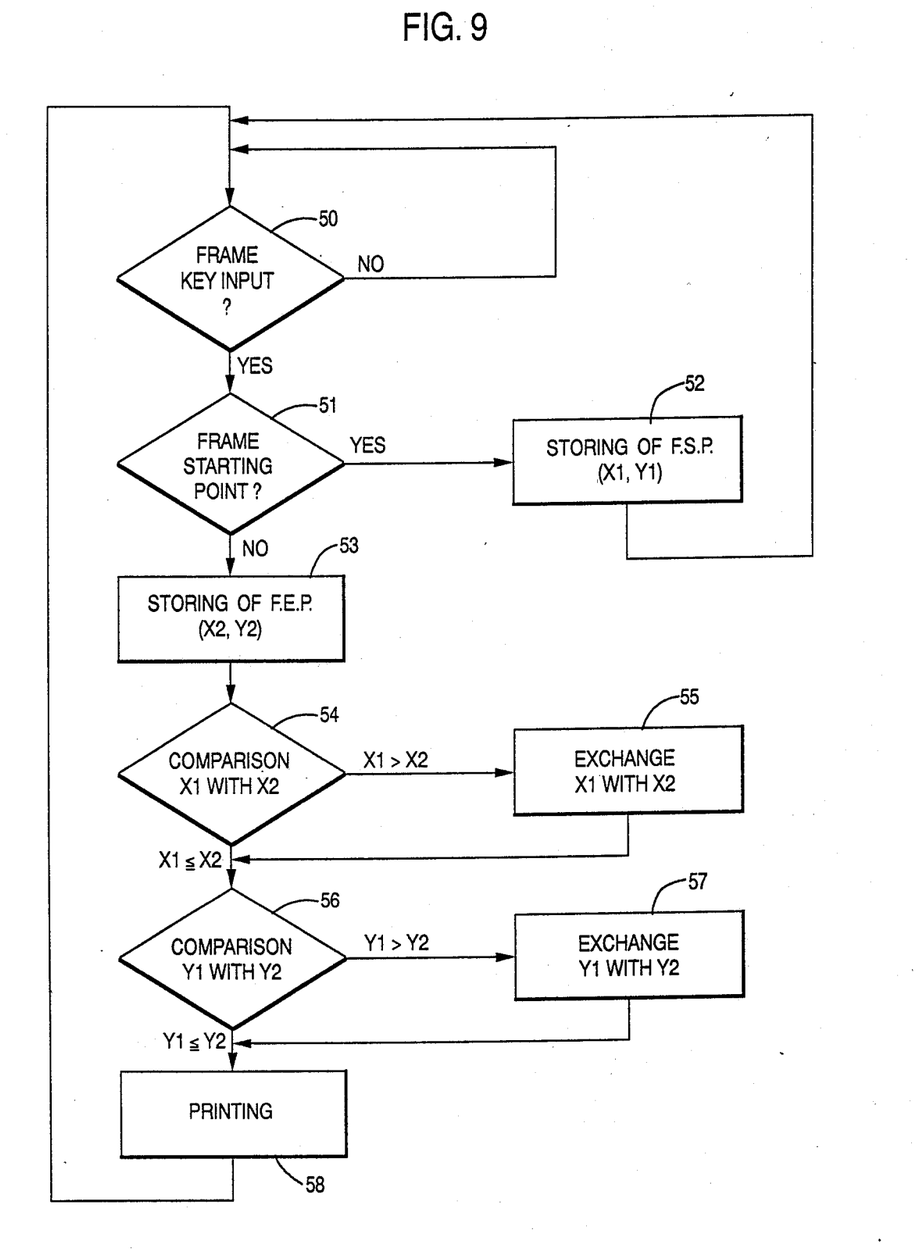
FIG. 9 is a flowchart except for the processes with regard to the dividing line of the frame of FIG. 8.

First, the operator moves the printing means 6 to the printing point 20. Then the printing means 6 is situated at the printing point 20. The operator then depresses the frame key 1d located on the keyboard 1. At step 50 in FIG. 9, the frame key distinguishing means 2d determines that the frame key 1d has been depressed. At step 51, according to the output of the frame key distinguishing means 2d, the starting point distinguish means 3c determines if this printing point 20 is the frame starting point. This judgement is carried out by the starting point distinguishing means 3c checking to determine whether the coordinate data of the printing point regarded as the frame starting point has already been stored in the starting point data memory area 7b. Since the coordinates data of the printing point regarded as the frame starting point has not been stored yet, the printing point 20 is regarded as the frame starting point. Since the printing point 20 is the frame starting point, at step 52 the printing point control means 3a records the data of the coordinates (X1,Y1) of the frame starting point in the starting point data memory area 7b. At this time, in response to the operation of the frame key 1d, the carriage 14 moves forward by one character width. Then, the operator depresses the index key 1b two times, which is used for moving the printing sheet by half of a line spacing. According to the two operations of the index key 1b, the platen 13 rotates some amount corresponding to one line spacing, and the printing means 6 moves to the printing point 21. Then, the operator depresses one of the character keys 1c corresponding to the character "A". From this operation, the character "A" is printed at the printing point 21, and the printing means 6 moves to the printing point 22. As is shown in FIG. 5(b), in the same way characters "ABC" are printed. After the printing of the last character "c", the operator depresses the index key 1d two times, again. According to the operations of the index key 1b, the printing means moves to the printing point 24. The operator depresses the frame key 1d again. On the operation of the frame key 1d, at step 50 in FIG. 9, the frame key distinguishing means 2d determines that the frame key 1d has been depressed. According to the output of the key distinguishing means 2d, at step 51, the starting point distinguishing means 3c checks the content of the starting point memory area 7b. The printing point 24 is not regarded as a frame starting point, because the data of the printing point of the frame starting point has already been stored in the starting point data memory area 7b. At step 53, the starting point distinguishing means 3c regards the printing point 24 as the frame ending point, and the printing point control means 3a records the coordinates data (X2,Y2) in the ending point data memory area 7c.

In response to the second operation of the frame key 1d, the electronic typewriter starts the calculation for the printing of the frame according to the stored data.

At steps 54–57, the electronic typewriter carries on a calculation when the operator puts the coordinates data of both the upper right vertex and the lower left vertex as the two diagonal vertex data, instead of both the upper left vertex and the lower right vertex. In more detail, at step 54, the coordinates comparing means 8a compares data X1 and X2, which are the X coordinates data of both the frame starting point and the frame ending point. If X1 is smaller than X2, at step 55, the coordinates comparing means 8a exchanges the data of the X coordinate of the frame starting point and the frame ending point. Then, at step 56, the coordinate comparing means 8a compares data Y1 and Y2, which are the Y coordinate data of the frame starting point and the frame ending point. If Y1 is smaller than Y2, at step 57, the coordinates comparing means 8a exchanges the data of the Y coordinates of both the frame starting point and the frame ending point. As explained above, if the operator puts in data of the printing point of the lower right and the upper left as the frame starting point and the frame ending point, the coordinates comparing means 8a calculates the coordinates data of both the upper left and the lower right of the frame from the coordinates data of both the lower left and the upper right.

Then, the electronic typewriter actually starts the printing of the frame, calculating coordinates data that correspond to both the starting point and ending point of the lines that compose a frame. At step 58, the control means 3 actually carries out the printing.

Figure 5C:
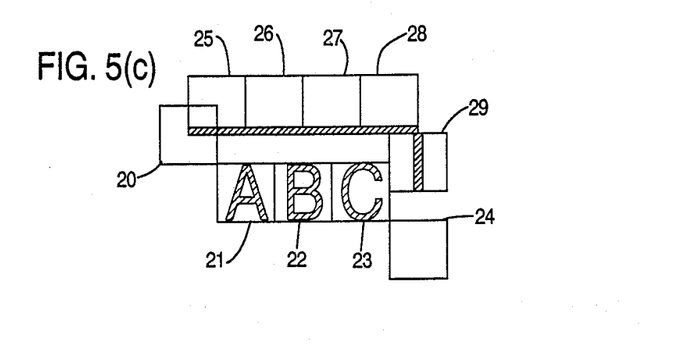
Figure 10:
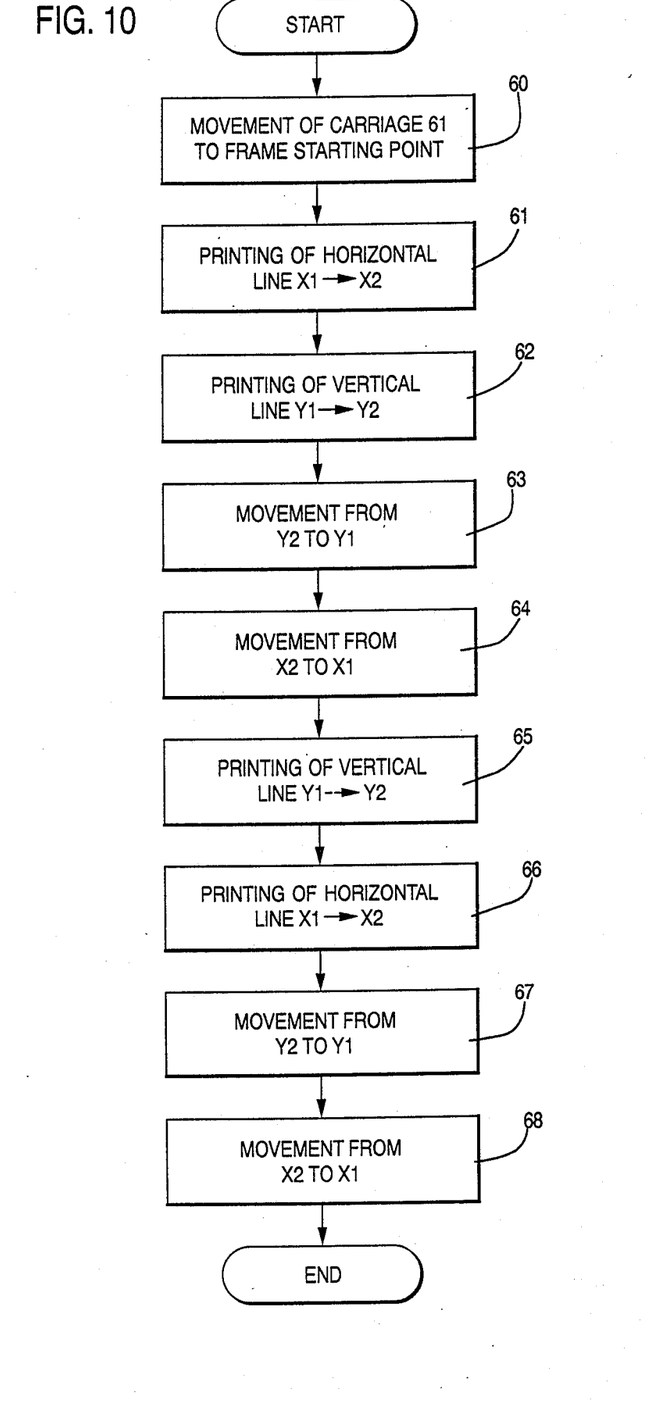
FIG. 10 is a flowchart which shows the movements of the electronic typewriter needed to print a frame.

Referring to FIG. 10, there is shown a flowchart of the actual printing of the frame. At step 60, the coordinates calculating means 8a calculates the coordinates data of the printing point 25 from data stored in the memory means 7. Then, according to the coordinates data, the control means 3 moves the printing means 6 to the printing point 25, controlling the printing point move means 4 and the sheet feed means 5. This condition is shown in FIG. 5(b). This printing point 25 is located at a position that is situated by one half a line spacing backward and by one character forward from the printing point 20. It uses a type of underline to print a horizontal line. Then, at step 61, the horizontal line printing means prints the upper horizontal line of the frame. At this time, the printing means 6 prints an underline one after another as is shown in FIG. 5(c), moving from the printing point 25 to the printing point 28. The control means 3 moves the printing means 6, which is situated forward by one character width from the printing point 28, backward by half of one character width and moves it by one line spacing toward the printing point 29.

Figure 5D:
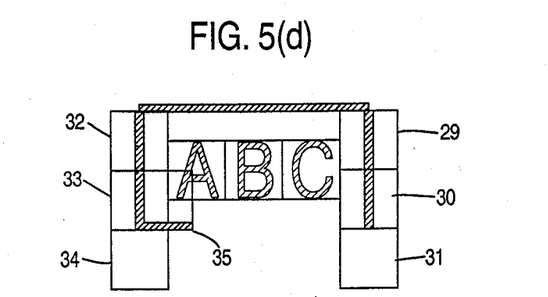
Figure 11:
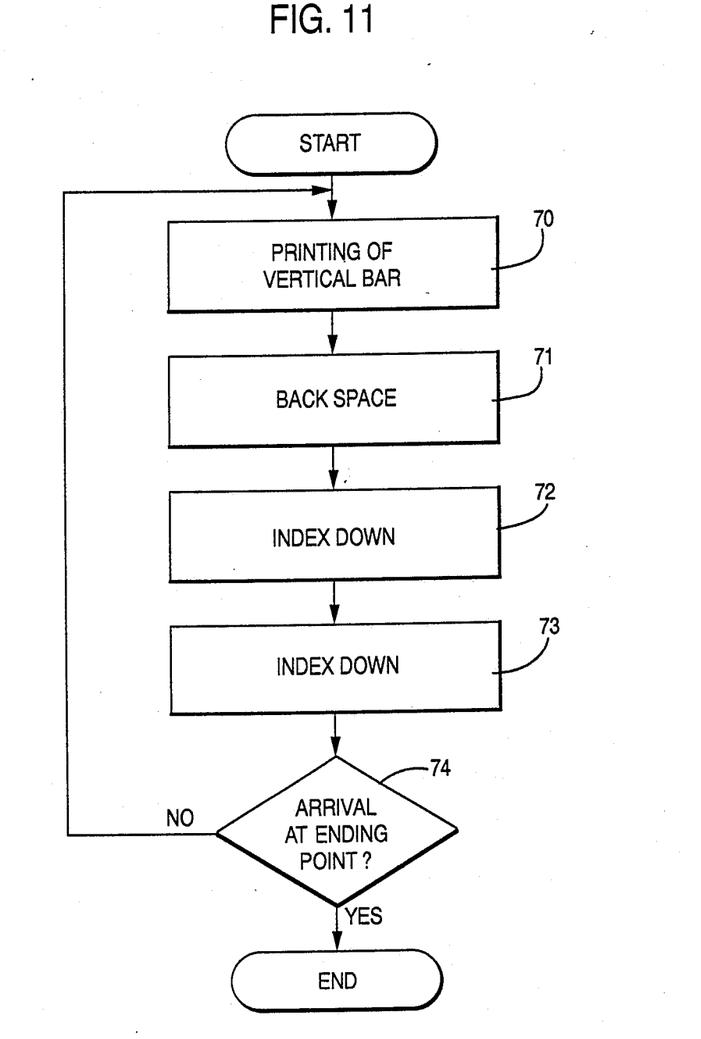
FIG. 11 is a flowchart which shows the movements of the electronic typewriter needed to print a vertical line.

There is shown a flowchart representing the process of the printing of a vertical line in FIG. 11. At step 70, the vertical line printing means 3e prints a vertical bar in a central position of an area corresponding to the printing point 29. Then, at step 71, the vertical line printing means 3e moves the printing means 6, which is situated forward by one character width from the printing point 29, backward by one character, and at steps 72 and 73, moves it by one line spacing. Next, at step 74, the vertical line printing means 3e determines if the vertical line has arrived at the ending point. Since the printing point 30 in FIG. 5(d) is not the ending point, the vertical line printing means 3e prints a vertical bar again. Then, at steps 71-73, the printing means 6 is moved to the printing point 31, and at step 74, the vertical line printing means 3e determines if the printing point 31 is the ending point. At step 63 and 64 in FIG. 10, the coordinates calculation means 8a calculates the coordinates data of the printing point 32. According to this data, the control means 3 moves the printing means 6 backward to the printing point 32. This printing point 32 is situated forward by half of one line spacing from the frame starting point. At step 65, the vertical line printing means 3e carries out vertical line printing as is shown in FIG. 11, from this printing point 32. When the printing means 6 arrives at printing point 34, at step 74 in FIG. 11, the vertical line printing means 3 determines if the vertical line has arrived at the ending point. At step 66 in FIG. 10, the vertical line printing means 3 moves the printing means 6 to the printing point 35, and prints the lower horizontal line of frame. Then, at step 67 and 68, the control means 3 moves the printing means 6 back to the printing point 20, and actually ends the printing of the frame.

In this embodiment, the electronic typewriter only stored the data of the frame starting point and the frame ending point. In applying this invention to an electronic typewriter that stores all of the operated keys in the operated order, the memory means stores "frame key", "index key", "index key", "A", "B", "C", "index key", "index key" and "frame key" in the operated order, after the printing of the frame. According to this stored data, the memory means has stored the relative relationship of the printing point located at the time when the frame key is operated and the printing point of the characters. For example, in the case of the calculation of the coordinates data of the printing point located at the time when the frame key has been depressed first, the calculation means adds each amount of movement caused by one operation of the frame key and two operations of the index key. Thus, the calculation means calculates the relative relationship of the printing point located at the time when the frame key is operated first and the printing point of the character "A".

After the printing of the characters "ABC" with the frame, if the operator wants to revise the characters stored in the memory means from "ABC" to "ABCD" and print with the frame on a new sheet, the data stored in the memory means is revised as "frame key", "index key", "index key", "A", "B", "C", "D", "index key", "index key" and "frame key", and the frame spreads for one character width automatically at the time of printing. For this reason, the operator needs not revise the frame in the case of the inserting of the character "D".

Moreover, printing many frames, the operator can print a table.

Figure 6:
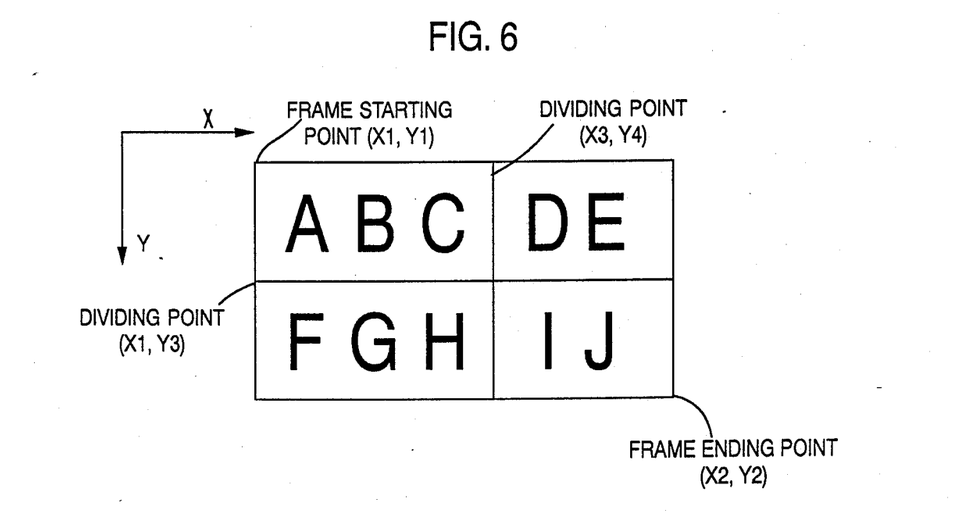
FIG. 6 is a plane view of a printed sheet on which an electronic typewriter of a preferred embodiment has made a table.
Figure 8:
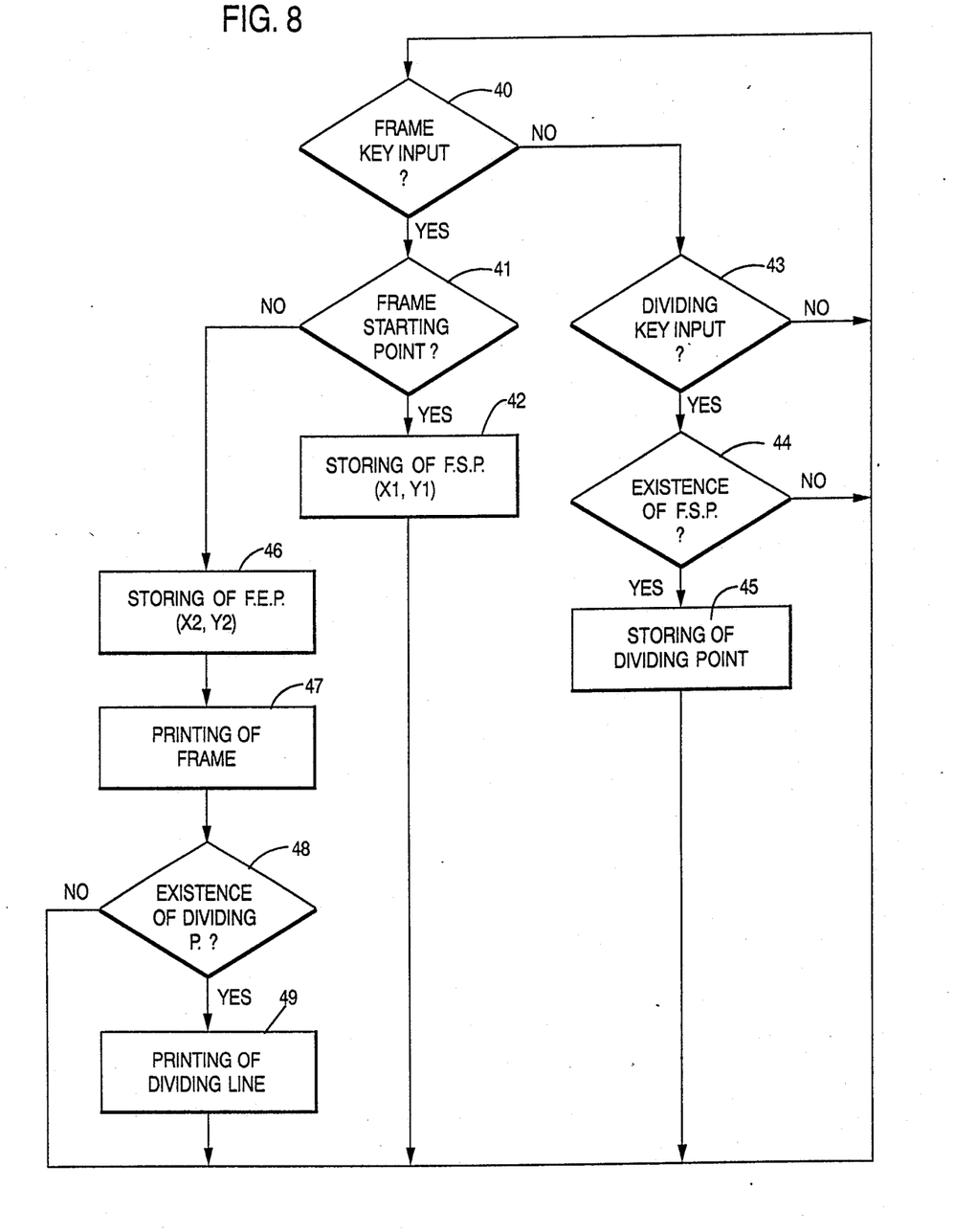
FIG. 8 is a flowchart which shows movements of a preferred embodiment of an electronic typewriter.

Referring to FIG. 6, there is shown a plane view in the case of the printing table according to the flowchart shown in FIG. 8. We define X-Y coordinates as is shown in FIG. 6. The coordinates data of the frame starting point is (X1,Y1). The coordinates data of the frame ending point is (X2,Y2). We define the starting point of the segment which divides the frame horizontally as the horizontal dividing point (X1,Y3). We define the starting point of the segment which divides the frame horizontally as the horizontal dividing point (X1,Y3). We define the starting point of the segment which divides the frame vertically between the character "C" and the character "D" as the vertical dividing point (X3,Y4).

Figure 7A:
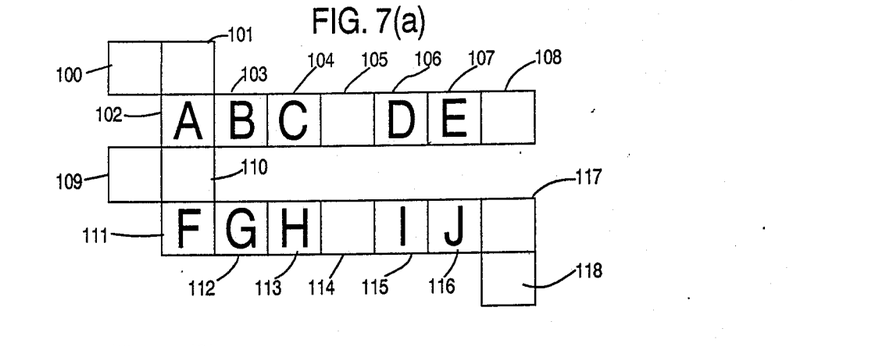
FIG. 7 is a plane view which shows a condition in the middle of printing as shown in FIG. 6.

In response to the operator's operation of the frame key 1d after moving the printing means 6 to the printing point 100 shown in FIG. 7(a), at step 40, the frame key distinguishing means 2d determines if the frame key 1d has been operated, and at step 41, the starting point distinguishing means 3c determines if this printing point 100 is the frame starting point. This determination is carried out in same way as the printing of only a frame mentioned above. Then, at step 42, the memory means 7 stores the coordinates data of the frame starting point in the starting point data memory area 7b. At this time, the printing means 6 is moved to the printing point 101 by the printing point control means 3a. Now, the operator depresses the index key 1b two times. According to these operations, the printing means 6 is moved to the printing point 102. Next, the operator enters characters "ABC". When the printing means 6 arrives at the printing point 105, the operator operates the dividing key 1e. Then, at step 43, the starting point distinguishing means 3c determines if the dividing key 1e has been depressed, and at step 44, the starting point distinguishing means determines if the coordinate data of the frame starting point has already been stored. Since the coordinate data of starting point has already been stored, the memory means 7 stored in data representing the location of the printing point 105 when the dividing key 1e has been depressed as the data of the dividing point. Next, the operator enters characters "DE", and depresses the return key 1a when the printing means 6 moves to the printing point 108. Then, the operator depresses the dividing key 1e. At step 43, the dividing key distinguishing means 2e determines if the dividing key 1e has been depressed, and at step 44, the distinguishing means 2e determines if the printing point 105 is the frame starting point. At step 45, the memory means 7 stores data of the printing point 109 as the dividing point. Then, the operator depresses the index key 1b two times, and enters characters "FGH" and space and character "IJ" at printing points 111-116.

The operator leaves a blank in the printing point 114 by putting in a space, which is for the printing of the vertical bar that divides frame.

In this example, the operator needs to count the number of characters that are inserted into one column. But the operator can do it easily by having set tabs previously, and by moving the printing point to the next tab by depressing the tab key every time after entering characters in each column. When the printing means 6 arrives at the printing point 117, the operator depresses the index key 1b two times. When the printing means 6 arrives at the printing point 118, the operator depresses a frame key 1d again.

Figure 7B:
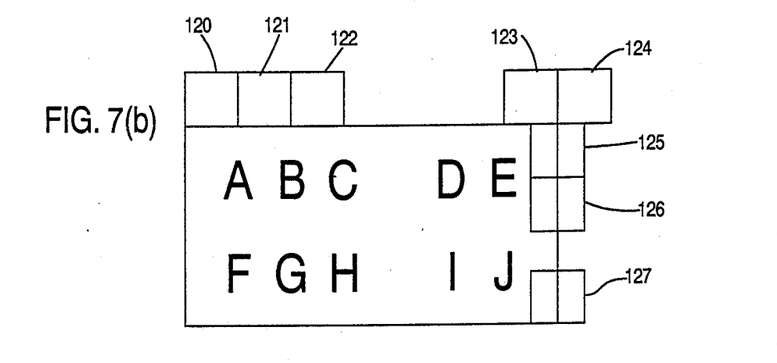
Figure 7C:
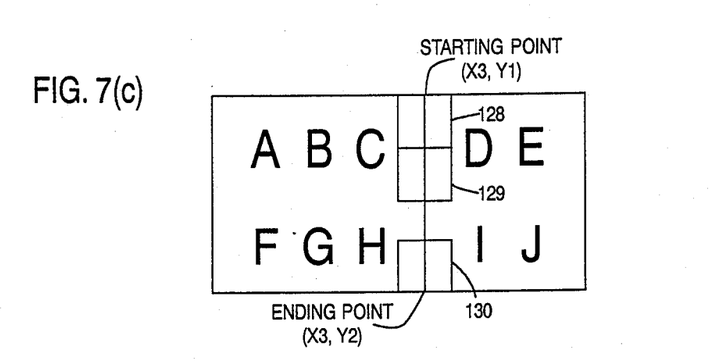
Figure 7D:
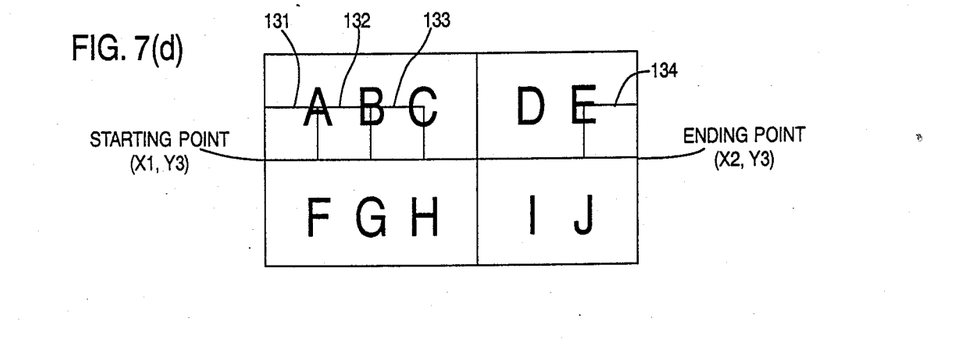

At step 40, the frame key distinguishing means 2d determines if the frame key 1d has been depressed, and at step 41, the starting point distinguishing means 3c determines if the printing point 118 is the frame starting point. Since the printing point 118 is not the frame starting point, the control means 3 regards this printing point as the frame ending point, and at step 46, records it in memory means 7. At step 47, the control means 3 actually carries out the printing in the same way as the printing of the frame only as noted above. This condition is shown in FIG. 7(b).

Figure 12:
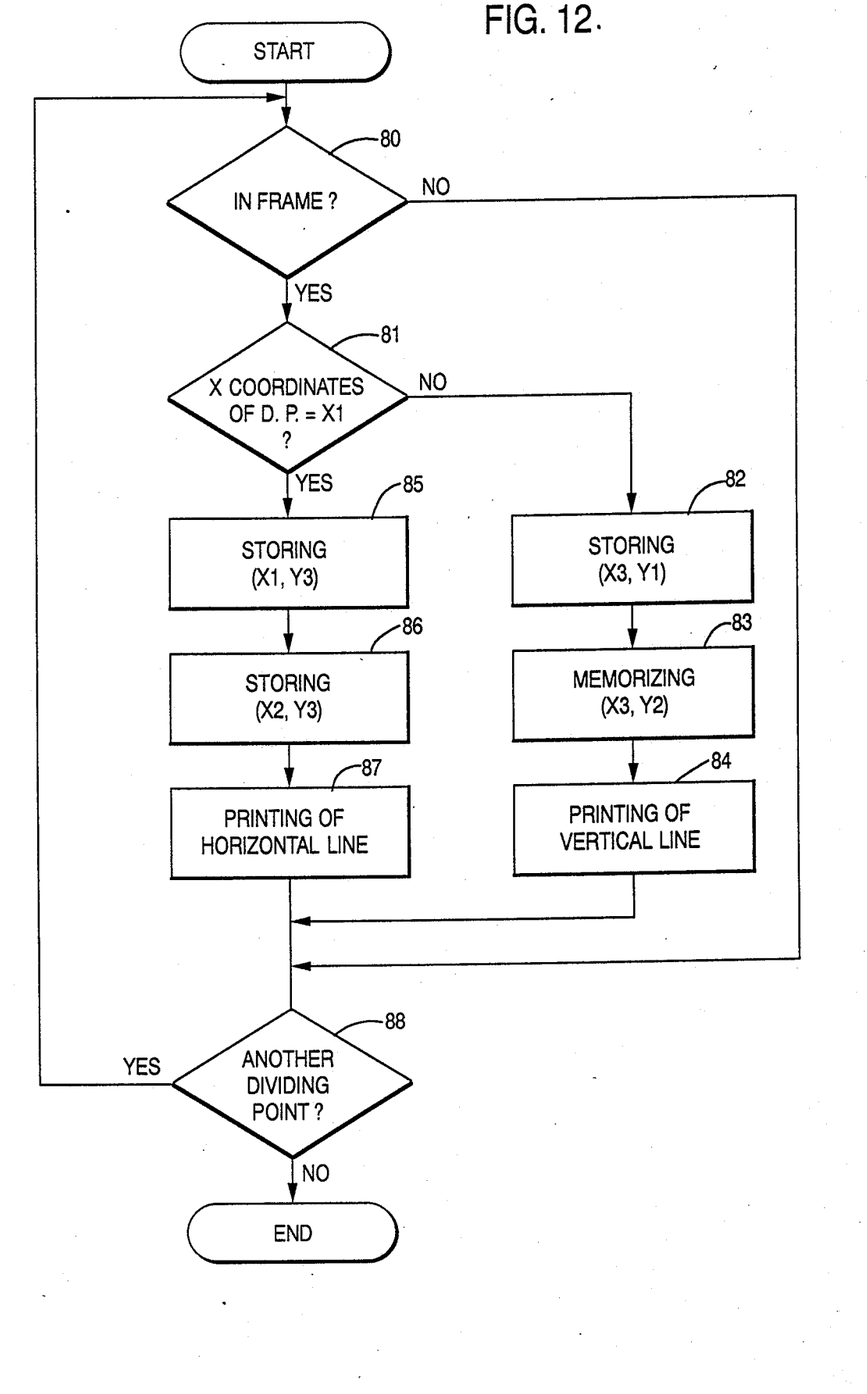
FIG. 12 is a flowchart which shows the movements needed to print a dividing line of a frame.

Next, at step 48, the dividing point distinguishing means 3d determines if the dividing point has been stored. Since the dividing point has been stored, at step 49, the control means 3 carries out the printing of the dividing line according to the flowchart shown in FIG. 12.

At step 80, the coordinates calculation means 8b determines if the first dividing point (X3,Y1) is in the frame. Since the dividing point (X3,Y1) is in the frame, at step 81, the coordinates calculation means 8b determines if the X coordinate of the dividing point (X3,Y1) is X1. Since the X coordinate of this dividing point is X3, at step 82, the coordinates calculation means 8b stores this coordinate data (X3,Y1) as the starting point of the dividing line, and stores the coordinate data (X3,Y2) as the ending point of the dividing line. Then, at step 84, the vertical line printing means 3 carries out the printing of the vertical dividing line. This printing of the vertical dividing line is carried on from the printing point 128 to the printing point 130 according to the flowchart shown in FIG. 11. Next, at step 88, the coordinates calculation means 8b determines if there is another dividing point, and at step 80 determines if the second dividing point (X1,Y3) is in the frame. Since the dividing point (X1,Y3) is in the frame, at step 81, the calculation means 8b determines if the X coordinate of the dividing point (X1,Y3) is X1. Since the X coordinate of the dividing point (X1,Y3) is X1, at step 85, the coordinates calculation means 8b stores the coordinate data (X1,Y3) as the starting point of the dividing line, and stores the coordinate data (X2,Y3) as the ending point of the dividing line. At step 87, the horizontal line printing means 3f carries out the printing of the horizontal line. This printing of the horizontal line is carried out in the same way as the printing of the horizontal line in the case of the printing of the frame only. In step 88, the coordinates calculation means 8b determines if there is no dividing point, and ends the printing of the dividing line.

In this embodiment, the electronic typewriter only stores data of the frame starting point, the frame ending point and the dividing point, and prints a table with a frame. In applying this invention to an electronic typewriter that stores all of the operated keys in the operated order, the memory means stores "frame key", "index key", "index key", "A", "B", "C", "dividing key", "D", "E", "return key", "dividing key", "index key", "index key", "F", "G", "H", "space key", "I", "J" and "frame key". According to this stored data, the memory means has stored the relative relationship in printing points at the time when the frame key and index key have been operated and the printing point of characters, in the same way as noted above in the printing of the frame only.

To carry on each of the steps noted above, the making of a table is carried out.

Although certain preferred embodiments have been shown and described, it should be understood that many changes and modifications may be made therein without departing from the scope of this invention.

What is claimed is:

1. An electronic typewriter comprising:
   character keys for entering data corresponding to characters;
   a frame key for entering data defining a printing point of two diagonal vertices of a rectangular frame that is to be printed;
   control keys for entering data defining movement of a printing point indefined directions;
   a printing means for printing characters in response to data entered by said character keys, said frame key and said control keys, and for moving the printing point for a distance character and control in said defined directions corresponding to each of said keys;
   a distinguishing means for determining whether or not an operated key is said frame key;
   a memory means for storing in response to a first operation of said frame key a first printing point data corresponding to one of two diagonal vertices of said rectangular frame, and for storing in response to a second operation of said frame key after some operation of other keys a second printing point data corresponding to the other of two diagonal vertices of said rectangular frame; said second printing point data being calculated by the addition of each amount of moving distance corresponding to each of keys that are operated between two operations of said frame key such that said rectangular frame is of a size which is dependent upon the keys which have been operated between two operations of said frame key;
   a control means for calculating in response to said second operation of said frame key the coordinate data of a starting position and an ending position of lines which compose said rectangular frame to be printed according to data stored in said memory means and in accord with said defined directions of printing point movement; said printing means printing said frame consisting of lines according to said control means.

2. An electronic typewriter according to claim 1, wherein said printing means has a type for printing a segment of a vertical line and a type for printing a segment of a horizontal line.

3. An electronic typewriter according to claim 2, wherein said printing means starts to print a frame when a frame key has been operated and when vertex data has already been stored in said memory means.

4. An electronic typewriter according to claim 1, wherein said control means includes a first and second data memory means for storing first and second vertex data; and wherein said control means compares data stored in said first memory means with data stored in said second memory means, and said control means exchanges the data stored in said first memory means and the data stored in said second memory means when said control means determines that the data stored in said first memory means is data corresponding to a right lower vertex of said frame to be printed and the data stored in said second memory means is data corresponding to a left vertex of said frame to be printed.

5. An electronic typewriter according to claim 1, wherein said distinguishing means checks said memory means when a frame key has been depressed and, if said memory means has stored no vertex data, then said distinguishing means regards frame key data just entered as first vertex data, and if said memory means has stored vertex data, then said distinguishing means regards vertex data stored in said memory means as first vertex data and vertex data just entered as second vertex data.

6. An electronic typewriter according to claim 5, wherein said control means sets a starting point of an upper horizontal line that composes said frame at a printing point which is situated backward by half a line spacing and forward by half a character width from said printing starting point, and sets an ending point of said upper horizontal line that composes said frame at a printing point which is situated in line with said starting point and backward by a half a character width from said printing ending point; and said control means makes said upper horizontal line that composes said frame by printing a type corresponding to an underline many times.

7. An electronic typewriter according to claim 5, wherein said control means sets an ending point of a lower horizontal line that composes said frame at a printing point which is situated backward by half a line spacing and backward by half a character width from said printing ending point, and sets a starting point of said lower horizontal line that composes said frame at a printing point which is situated in line with said printing ending point and forward by half a character width from said printing starting point; and said control means makes a lower horizontal line that composes said frame by printing a type corresponding to an underline many times.

8. An electronic typewriter according to claim 5, wherein said control means sets a starting point of a left vertical line that composes said frame at a printing point which is situated in a same character column and forward by half a line spacing from said printing starting point, and sets an ending point of said left vertical line that composes said frame at a printing point which is situated in a same character column of said starting point and backward by half a line spacing from said printing ending point; and said control means makes said left vertical line that composes said frame by printing a type corresponding to a vertical bar many times.

9. An electronic typewriter according to claim 5, wherein said control means sets a starting point of a right vertical line that composes said frame at a printing point which is situated in a same character column and backward by half a line spacing from said printing ending point, and sets an ending point of said right vertical line that composes said frame at a printing point which is situated in a same character column of said starting point and forward by half a line spacing from said printing starting point; and said control means makes said right vertical line that composes said frame by printing a type corresponding to a vertical bar many times.

10. An electronic typewriter as in claim 1, further comprising:
   a frame dividing key for setting a printing point of a frame dividing line to be printed;
   wherein said memory means, in response to an operation of said frame dividing key, stores said printing point of a frame dividing line and wherein said control means calculates the coordinates data of a starting position and an ending position of said frame dividing line and wherein said printing means prints said frame dividing line.

11. An electronic typewriter according to claim 10, further comprising: an index key for moving a printing sheet by half a line spacing; wherein said memory means stores operations of said character key, said frame key and said index key in operated order, and as a result thereof stores a relative relationship of a printing point when said frame key has been depressed and a printing point of characters, and said control means effects printing according to data stored in said memory means.

12. An electronic typewriter according to claim 11, wherein said control means including a calculation means which compares two printing points when said frame key has been depressed, and stores printing point data that locates an upper left point as a frame printing starting point, and stores printing point data that locates a lower right point as a frame printing ending point.

13. An electronic typewriter according to claim 12, wherein said calculation means calculates an amount of movement of said carriage and said sheet feeding means according to coordinate data of both said printing starting point and printing ending point.

14. An electronic typewriter according to claim 13, wherein said calculation means sets a starting point of an upper horizontal line that composes said frame at a printing point which is situated backward by half a line spacing and forward by half a character width from said printing starting point, and sets an ending point of an upper horizontal line that composes said frame at a printing point which is situated in line with said starting point and backward by half a character width from said printing ending point; and said control means makes said upper horizontal line that composes said frame by printing a type corresponding to an underline many times.

15. An electronic typewriter according to claim 13, wherein said calculation means sets an ending point of a lower horizontal line that composes said frame at a printing point which is situated backward by half a line spacing and backward by half a character width from said printing ending point, and sets a starting point of said lower horizontal line that composes said frame at a printing point which is situated in line with said printing ending point and forward by half a character width from said printing starting point; and said control means makes said lower horizontal line that composes said frame by printing a type corresponding to an underline many times.

16. An electronic typewriter according to claim 13, wherein said calculation means sets a starting point of a left vertical line that composes said frame at a printing point which is situated in a same character column and forward by half a line spacing from said printing starting point, and sets an ending point of said left vertical line that composes said frame at a printing point which is situated in a same character column of said starting point and backward by half a line spacing from said printing ending point; and said control means makes said left vertical line that composes said frame by printing a type corresponding to a vertical bar many times.

17. An electronic typewriter according to claim 13, wherein said calculation means sets a starting point of a right vertical line that composes said frame at a printing point which is situated in a same character column and backward by half a line spacing from said printing ending point, and sets an ending point of said right vertical line that composes said frame at a printing point which is situated in a same character column of said starting point and forward by half a line spacing from said printing starting point; and said control means makes said right vertical line that composes said frame by printing a type corresponding to a vertical bar many times.

18. An electronic typewriter as in claim 10, wherein said control means controls said printing means so as to advance a carriage when said frame dividing key has been operated and so as to print said frame and frame dividing line according to data calculated by said control means.

19. An electronic typewriter according to claim 18, further comprising: an index key for moving a printing sheet by half a line spacing by causing a sheet feed means to move; wherein said memory means stores operations of said character key, said frame key and said index key in operated order, and as a result thereof stores a relative relationship of a printing point when said frame key has been depressed and a printing point of characters, and said control means effects printing according to data stored in said memory means.

20. An electronic typewriter according to claim 19, wherein said control means including a calculation means which compares two printing points when said frame key has been depressed, and stores printing point data that locates an upper left point as a frame printing starting point, and stores printing point data that locates a lower right point as a frame printing ending point.

21. An electronic typewriter according to claim 20, wherein said calculation means calculates an amount of movement of said carriage and said sheet feeding means according to coordinate data of both said printing starting point and printing ending point.

22. An electronic typewriter according to claim 21, wherein said calculation means sets a starting point of an upper horizontal line that composes said frame at a printing point which is situated backward by half a line spacing and forward by half a character width from said printing starting point, and sets an ending point of said upper horizontal line that composes said frame at a printing point which is situated in line with said starting point and backward by half a character width from said printing ending point; and said control means makes said upper horizontal line that composes said frame by printing a type corresponding to an underline many times.

23. An electronic typewriter according to claim 21, wherein said calculation means sets an ending point of a lower horizontal line that composes said frame at a printing point which is situated backward by half a line spacing and backward by half a character width from said printing ending point, and sets a starting point of said lower horizontal line that composes said frame at a printing point which is situated in line with said printing ending point and forward by half a character width from said printing starting point; and said control means makes said lower horizontal line that composes said frame by printing a type correspond to an underline many times.

24. An electronic typewriter according to claim 21, wherein said calculation means sets a starting point of a left vertical line that composes said frame at a printing point which is situated in a same character column and forward by half a line spacing from said printing starting point, and sets an ending point of said left vertical line that composes said frame at a printing point which is situated in a same character column of said starting point and backward by half a line spacing from said printing ending point; and said control means makes said left vertical line that composes said frame by printing a type corresponding to a vertical bar many times.

25. An electronic typewriter according to claim 21, wherein said calculation means sets starting point of a right vertical line that composes said frame at a printing point which is situated in a same character column and backward by half a line spacing from said printing ending point, and sets an ending point of said right vertical line that composes said frame at a printing point which is situated in a same character column of said starting point and forward by half a line spacing from said printing starting point; and control means makes said right vertical line that composes said frame by printing a type corresponding to a vertical bar many times.

26. An electronic typewriter as in claim 1, wherein said memory means further stores the operations of said frame key.

* * * * *